(12) United States Patent
Li

(10) Patent No.: US 10,843,524 B2
(45) Date of Patent: Nov. 24, 2020

(54) REMOTE VEHICLE CONTROL SYSTEM AND METHOD

(71) Applicants: Zhejiang Geely Holding Group Co., Ltd., Hangzhou (CN); Zhejiang Geely Automobile Research Institute Co., Ltd., Taizhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY AUTOMOBILE RESEARCH INSTITUTE CO., LTD., Taizhou (CN)

(*) Notice: Subject to any disclaimer, the term of this patent is extended or adjusted under 35 U.S.C. 154(b) by 225 days.

(21) Appl. No.: 16/085,996

(22) PCT Filed: Sep. 28, 2016

(86) PCT No.: PCT/CN2016/100506
§ 371 (c)(1),
(2) Date: Sep. 17, 2018

(87) PCT Pub. No.: WO2017/157000
PCT Pub. Date: Sep. 21, 2017

(65) Prior Publication Data
US 2019/0030987 A1    Jan. 31, 2019

(30) Foreign Application Priority Data
Mar. 18, 2016    (CN) .......................... 2016 1 0156133

(51) Int. Cl.
*B60W 10/30*    (2006.01)
*G10L 15/22*    (2006.01)
(Continued)

(52) U.S. Cl.
CPC ......... *B60H 1/00657* (2013.01); *B60H 1/008* (2013.01); *B60W 10/30* (2013.01);
(Continued)

(58) Field of Classification Search
CPC ...... B60K 35/00; G07C 9/00; G07C 9/00309; G07C 5/00; G07C 5/008; B60R 25/00;
(Continued)

(56) References Cited

U.S. PATENT DOCUMENTS 6,028,537 A * 2/2000 Suman ................... B60K 35/00
340/988
6,357,244 B1   3/2002 Mori
(Continued)

FOREIGN PATENT DOCUMENTS

CN        1976833 A    6/2007
CN      102316162 A    1/2012
(Continued)

*Primary Examiner* — Yonel Beaulieu
(74) *Attorney, Agent, or Firm* — Cheng-Ju Chiang

(57) ABSTRACT

The remote vehicle control system and method are provided. The remote vehicle control system includes: a mobile terminal, an ECU, and a server, the server includes an control module; the mobile terminal, is connected to the server via a wireless network, and is adapted to send control instructions to the ECU via the server; the control module of the ECU, is adapted to receive control instructions sent by the mobile terminal via the server, start vehicle engine, turn on corresponding electronic device of the vehicle, and adjust to a set value a period of time before next travel.

12 Claims, 5 Drawing Sheets

(51) Int. Cl.
  *H04L 29/08* (2006.01)
  *B60H 1/00* (2006.01)
  *G05B 19/042* (2006.01)

(52) U.S. Cl.
  CPC .......... *G05B 19/0423* (2013.01); *G10L 15/22* (2013.01); *H04L 67/125* (2013.01); *G10L 2015/223* (2013.01)

(58) Field of Classification Search
  CPC ....... B60R 25/04; B60R 25/33; B60R 25/102; B60W 10/00; B60W 10/30; H04L 67/00; H04L 67/125; B60H 1/00; B60H 1/008; B60H 1/00657
  See application file for complete search history.

(56) References Cited

U.S. PATENT DOCUMENTS

| | | | |
|---|---|---|---|
| 9,800,717 | B2 | 10/2017 | Ma et al. |
| 2002/0186144 | A1* | 12/2002 | Meunier ................ G07B 15/00 340/4.6 |
| 2004/0194479 | A1 | 10/2004 | Umebayashi et al. |
| 2012/0116608 | A1 | 5/2012 | Park et al. |
| 2013/0079978 | A1 | 3/2013 | Uyeki |
| 2014/0074480 | A1 | 3/2014 | Gratke et al. |
| 2015/0158368 | A1* | 6/2015 | Herr-Rathke ...... B60H 1/00964 701/2 |
| 2015/0350413 | A1 | 12/2015 | Ma et al. |
| 2017/0279957 | A1* | 9/2017 | Abramson et al. .......... H04M 1/6075 |

FOREIGN PATENT DOCUMENTS

| | | |
|---|---|---|
| CN | 102673497 A | 9/2012 |
| CN | 202679415 U | 1/2013 |
| CN | 103095745 A | 5/2013 |
| CN | 103903091 A | 7/2014 |
| CN | 104184795 A | 12/2014 |
| CN | 104597787 A | 5/2015 |
| CN | 104678965 A | 6/2015 |
| CN | 104802734 A | 7/2015 |
| CN | 204547982 U | 8/2015 |
| CN | 105262846 A | 1/2016 |
| CN | 204988297 U | 1/2016 |
| CN | 105717814 A | 6/2016 |
| JP | 2003-113764 A | 4/2003 |
| JP | 2006-21659 A | 1/2006 |
| JP | 2009-23448 A | 2/2009 |
| JP | 2013-535121 A | 9/2013 |
| WO | 2014/208057 A1 | 12/2014 |
| WO | 2016/006385 A1 | 1/2016 |

* cited by examiner

REMOTE VEHICLE CONTROL SYSTEM AND METHOD

The present application is a 35 U.S.C. § 371 National Phase conversion of International (PCT) Patent Application No. PCT/CN2016/100506, filed on Sep. 28, 2016, which is based on and claims priority of Chinese Patent Application No. 201610156133.7, filed on Mar. 18, 2016. The entire disclosure of the above-identified application, including the specification, drawings and claims are incorporated herein by reference in its entirety The PCT International Patent Application was filed and published in English.

FIELD OF THE INVENTION

The present disclosure relates to vehicle technology, and more particularly to a remote vehicle control system, and a remote vehicle control method.

BACKGROUND OF THE INVENTION

Nowadays, more and more people prefer driving to and from work regularly. Generally, a vehicle is equipped with many devices, e.g., an air conditioner, front windshields, or the like. The air conditioner is for controlling the temperature and humidity of the air in the interior thereof. The air conditioner generates warm air from a heater in the winter, thus keeping the interior of the vehicle warm, and generates cool air from an evaporator in the summer, thus keeping the interior of the vehicle cool. The front windshields are for reducing air flow resistance. However, the traditional vehicles generally rely on manual operation to control the equipped devices, e.g., the air conditioner in the vehicle is not turned on in advance. Especially in the hot summer or the cold winter, if the vehicle exposes to the surrounding environment for a long time, the interior temperature will be too high or too low. When the driver comes into the vehicle, he has to be in the high or low temperature environment for a long time until the air conditioner is controlled to meet the comfortable requirement, thereby making the driver feel inconvenient. In addition, if the outside temperature is too low in the winter, there may be ice or frost on the front windshields or rearview mirrors etc., the driver need take a long time to remove the ice or frost. These problems cause a very poor user experience.

With the development of the science and technology, people have higher and higher pursuits for automation and intelligent control of the vehicle. The current remote vehicle control system uses an internet technology only to achieve a simple control, and the automatic level is not high. Thereby, how to increase the automatic level for the vehicle control system is an urgent problem to be solved.

SUMMARY OF THE INVENTION

To support batch processing for the data, embodiments of the present invention provide a data storage method and a data storage device, and a common data type of component.

According to one embodiment of the present invention, a remote vehicle control system includes: a mobile terminal, an ECU, and a server, the server comprising an control module; the mobile terminal, connected to the server via a wireless network, and adapted to send control instructions to the ECU via the server; the control module of the ECU, adapted to receive control instructions sent by the mobile terminal via the server, start vehicle engine, turn on corresponding electronic device of the vehicle, and adjust to a set value a period of time before next travel.

According to another embodiment of this disclosure, a remote vehicle control method includes: a mobile terminal sends control instructions to an ECU via a server; a control module of the ECU receives control instructions sent by the mobile terminal via the server; the control module of the ECU starts vehicle engine, turn on corresponding electronic device of the vehicle, and adjust to set value a period of time before next travel.

Embodiments of the present disclosure may provide several advantages, including but not limited to the following.

The remote vehicle control system provided by the present embodiment can send control instructions to the ECU by the mobile terminal via the server. The control module of the ECU receives control instructions sent by the mobile terminal via the server, starts the vehicle engine, turns on the corresponding electronic device of the vehicle, and adjust to the set value a period of time before next travel, thereby, ensuring the connection between the mobile terminal and the ECU via the server, realizing the remote control of the vehicle, making the mobile terminal become a steward, and increasing user experience and safety.

DETAILED DESCRIPTION OF PREFERRED EMBODIMENTS

To make the objective, the technical solutions and advantages of the present invention more clear and understandable, embodiments of the present disclosure will be described in detail accompanying with figures as follows.

The First Embodiment

Figure 1:
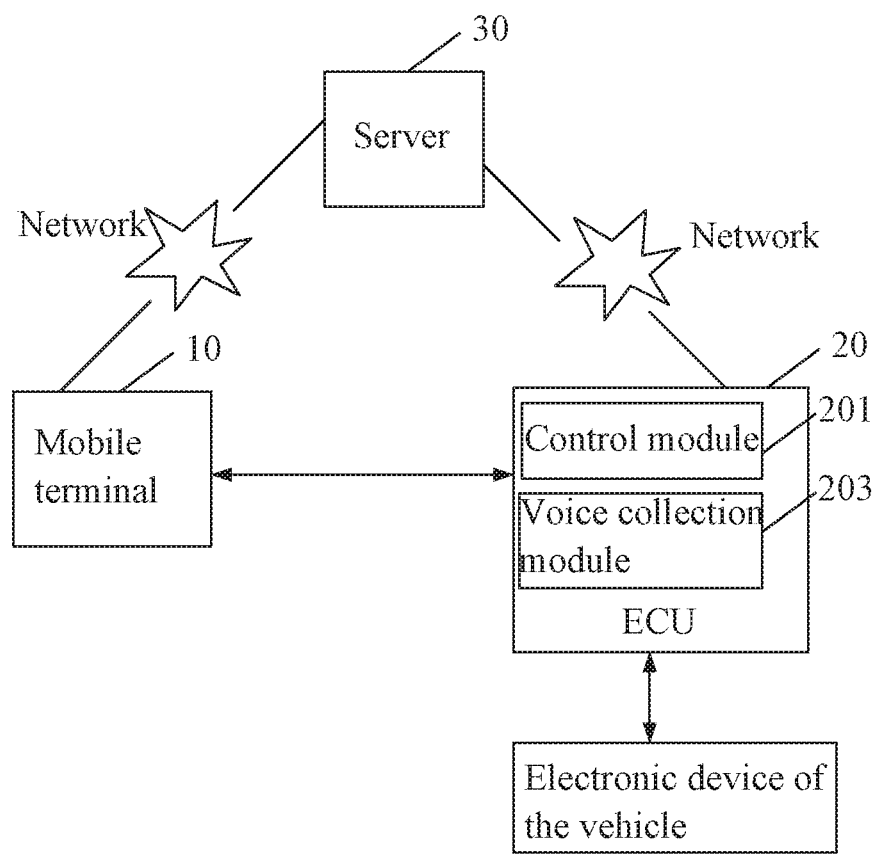
FIG. 1 is a schematic block diagram of a remote vehicle control system in accordance with example embodiments of the present disclosure.

FIG. 1 is a schematic block diagram of a remote vehicle control system in accordance with an exemplary embodiment of the present disclosure. Referring to FIG. 1, the remote vehicle control system may include a mobile terminal 10, an ECU (Electronic Control Unit) 20, a server 30. Preferably, the ECU 20 may include a control module 201.

In detail, the mobile terminal 10 is connected to the server 30 via a wireless network, and is configured to send control instructions to the ECU 20 via the server 30.

In some examples, the mobile terminal 10 may be a mobile phone, a tablet, a portable computer, or other mobile communication device. The wireless network may include, but is not limited to, WIFI, 3G, 4G, 5G, or GPRS network, etc. The server 30 transfers control instructions to the ECU 20 which the mobile terminal 10 sends, thereby achieving the effect of remote controlling the vehicle, and it is more convenient to use.

In addition, system software can be installed on the mobile terminal 10. And the mobile terminal 10 can send instructions to the ECU 20 via the system software. The system software can be set to have the same interfaces or buttons as the ECU 20, to make the mobile terminal 10 become the second ECU 20 of the vehicle, thus improving convenience of the operation.

In addition, the mobile terminal 10 can send control instructions to the ECU 20 via the server 30, according to text message, WeChat, voice message which users edit. For example, the user uses the mobile terminal 10 to edit the text message "01, 25 degree" which indicates to control an electronic device of the vehicle, such as an air conditioner to be turned on and be adjusted to 25 degrees. The mobile terminal 10 can also send control instructions to the ECU 20 via the server 30 according to calls which the user makes. The ECU 20 can identify text message, voice message, and calls. The control instructions are for setting the vehicle engine to start, and setting the air conditioner, stereo, purifier, rearview mirrors, seat heating device, seat ventilation etc., to be turned on and be adjusted to a set value.

Preferably, the ECU 20 may also include a voice collection module 203.

The ECU 20 may be connected to the server 30 via a wired network or a wireless network. The control module 201 of the ECU 20 is configured to receive control instructions sent by the mobile terminal 10 via the server 30, start the vehicle engine, turn on the corresponding electronic device of the vehicle, and adjust to the set value a period of time before next travel, such as ten minutes, according to control instructions. Among them, the electronic device of the vehicle may include purifier, radio, air conditioner, stereo, or other devices. The control instructions at least include the following information: next travel time of the vehicle, controlling the corresponding electronic device of the vehicle to be turned on and be adjusted to a set value, etc.

The voice collection module 203 of the ECU 20, is configured to collect user's voice information after turning off vehicle engine, and identify the user's voice information, if successfully identifies, start the vehicle engine, turn on the corresponding electronic device of the vehicle, and adjust to the set value a period of time before next travel according to the user's voice information, if not successfully identifies, start the vehicle engine, turn on the corresponding electronic device of the vehicle, and adjust to the set value a period of time before next travel according to default settings.

After turning off the vehicle engine, the ECU 20 can ask the user via a speaker that when the next travel starts, and whether there are other requirements. The user tells the ECU 20 the next travel time, temperature requirements in the vehicle, and/or turning on stereo, radio, according to the actual situation. The voice collection module 203 of the ECU 20 identifies the user's voice information, if successfully identifies, start the vehicle engine, turn on the corresponding electronic device of the vehicle, and adjust to the set value a period of time before next travel according to the user's voice information, if successfully identifies, start the vehicle engine, turn on the corresponding electronic device of the vehicle, and adjust to the set value a period of time before next travel according to default settings. In some examples, when the user has no requirement for temperature of the air conditioner, the default settings for temperature of the air conditioner can be 23-25 degrees Celsius, the default settings for wind speed is automatic and internal circulation, which can quickly improve the temperature in the vehicle, save energy and reduce emission. The air conditioner can control internal temperature of the vehicle, and adjust the temperature in the vehicle before the driver comes into the vehicle, so that the driver feels comfortable during driving the vehicle.

The server 30 is configured to obtain weather forecast, provide suggestions to the mobile terminal 10 according to the weather forecast, the next travel and vehicle location. The mobile terminal 10 sends control instructions to the ECU 20 via the server 30 according to the suggestions. The suggestions may include, e.g., suggestion about start time of the vehicle engine according to weather, start suggestion about all kinds of vehicle electronic device, or suggestion about turning on the purifier according to haze situation.

The server 30 can also send radio programs to the ECU 20, etc. according to radio situation at that time.

Preferably, the mobile terminal 10 can also obtain location information of the vehicle which the vehicle navigation system outputs, and match location information of the vehicle with map information, can also send suggestions to the ECU 20 via the server 30, for example, send local road conditions of the next travel, arrive time of destination, destination temperature, or haze situation of the destination etc. The vehicle navigation system can be set on the vehicle, which is configured to position the vehicle, and obtain location information, such as longitude, dimension, height information, and provide the location information to the mobile terminal 10. The mobile terminal 10 match location information of the vehicle with map information, to obtain the destination, obtain the temperature of the destination and haze situation of the destination according to the weather forecast of the destination, and also obtain the local road conditions of the next travel time according to the next travel location, and the above information as suggestions sent to the ECU 20.

The remote vehicle control system provided by the present embodiment can send control instructions to the ECU by the mobile terminal via the server. The control module of the ECU receives control instructions sent by the mobile terminal via the server, starts the vehicle engine, turns on the corresponding electronic device of the vehicle, and adjust to the set value a period of time before next travel, thereby, ensuring the connection between the mobile terminal and the ECU via the server, realizing the remote control of the vehicle, making the mobile terminal become a steward, and increasing user experience and safety.

The Second Embodiment

Figure 2:
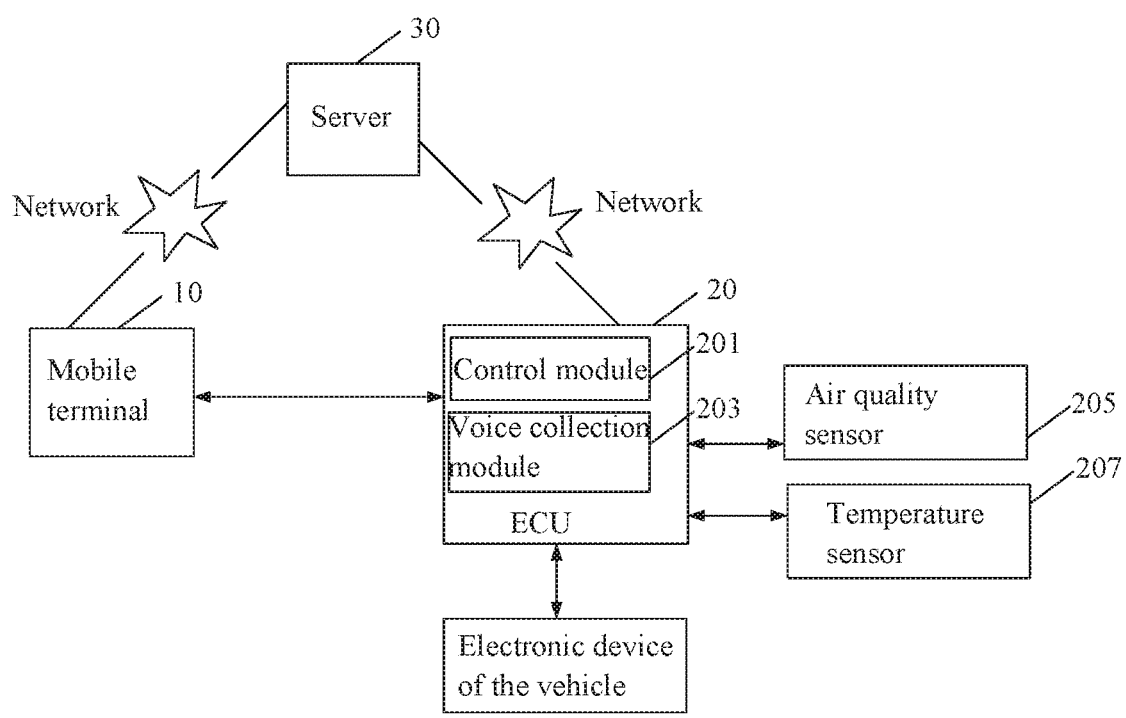
FIG. 2 is a schematic block diagram of a remote vehicle control system in accordance with example embodiments of the present disclosure.

FIG. 2 is a schematic block diagram of a remote vehicle control system in accordance with example embodiments of the present disclosure. Referring to FIG. 2, the remote vehicle control system further includes an air quality sensor 205 and/or a temperature sensor 207.

The air quality sensor 205 is connected to the ECU 20, and is configured to detect air quality information of the vehicle, and provide the detected air quality information to the ECU 20 via the server 30. The ECU 20 provides the detected air quality information to the mobile terminal 10 via the server 30. The mobile terminal 10 sends control instructions for turning on the purifier to the ECU 20 via the server 30 according to the air quality information of the vehicle. The control module 201 of the ECU 20 is also configured to when receiving control instructions for turning on the purifier, start the vehicle engine, and turn on the purifier a period of time before next travel.

Preferably, the temperature sensor 207, is connected to the ECU 20, and is configured to detect interior temperature of the vehicle, and provide the detected interior temperature to the ECU 20. The ECU 20 provides the detected interior temperature to the mobile terminal 10 via the server 30. The mobile terminal 10 sends control instructions for adjusting air conditioner according to the detected interior temperature. The control module 201 of the ECU 20 is also configured to when receiving control instructions for adjusting the air conditioner, start the vehicle engine, turn on the air conditioner, and adjust to the set value a period of time before next travel.

Among them, after the user is off the vehicle, the user's mobile terminal 10 can use the system software to be connected to the ECU 20 via the Internet (3G, 4G or WIFI network) and the server 30. The ECU 20 can detect vehicle environment information via the air quality sensor 205 or the temperature sensor 207 etc., for example, the ECU 20 can detect air quality information via the air quality sensor 205 and can detect interior temperature of the vehicle via the temperature sensor 207. The user can observe and change settings of the ECU 20 via the mobile terminal 10, and change next travel time or start the engine in advance etc. according to the vehicle environment information. When the interior temperature of the vehicle is too high or too low, or air quality of the vehicle is too poor, start the vehicle engine or turn on the purifier to adjust the vehicle environment earlier than expected, thereby improving user experience.

The mobile terminal 10 is also configured to determine the interior temperature of the vehicle is lower than a preset value, send control instructions for blowing wind and removing frost to the ECU 20 via the server. The control module 201 of the ECU 20 is also configured to when receiving control instructions for blowing wind and removing frost, start the vehicle engine, turn on the air conditioner of the vehicle to blow wind for the front windshield glass, and turn on rearview mirror to remove frost a period of time before next travel.

The mobile terminal 10 is also configured to determine the interior temperature of the vehicle is lower than a preset value, send control instructions for heating and ventilating to the ECU 20 via the server. The control module 201 of the ECU 20 is also configured to when receiving control instructions for heating and ventilating, start the vehicle engine, turn on the seat heating device to heat seat, and turn on seat ventilation device to ventilate seat.

Among them, if the interior temperature of the vehicle is too low, the front windshield glass may produce mist, and the rearview mirror may also be mist or frost, then the ECU 20 can start the vehicle engine, turn on the air conditioner of the vehicle to blowing wind for the front windshield glass, and turn on rearview mirror to remove frost. In a vehicle equipped with seat heating device or seat ventilation device, the ECU 20 can turn on the seat heating device to heat seat, and turn on seat ventilation device to ventilate seat.

The remote vehicle control system provided by the present embodiment can detect air quality information of the vehicle via the air quality sensor and detect interior temperature of the vehicle via the temperature sensor. The mobile terminal can change settings of the ECU according to the vehicle environment information, for example, change next travel time or start the engine in advance. When the interior temperature of the vehicle is too high or too low, or air quality of the vehicle is too poor, the ECU can start the vehicle engine or turn on the purifier to adjust the vehicle environment earlier than expected, thereby improving user experience, not only facilitating remotely control the vehicle, but also ensuring the safety of the vehicle.

In addition, the remote vehicle control system provided by the present embodiment can also determine the interior temperature of the vehicle is lower than a preset value, the mobile terminal can send control instructions for blowing wind and removing frost to the ECU via the server. When receiving control instructions for blowing wind and removing frost, the control module of the ECU can start the vehicle engine, turn on the air conditioner of the vehicle to blow wind for the front windshield glass, and turn on rearview mirror to remove frost, and can also turn on the seat heating device to heat seat, and turn on seat ventilation device to ventilate seat, thereby improving user experience, not only facilitating remotely control the vehicle, but also ensuring the safety of the vehicle.

The Third Embodiment

Figure 3:
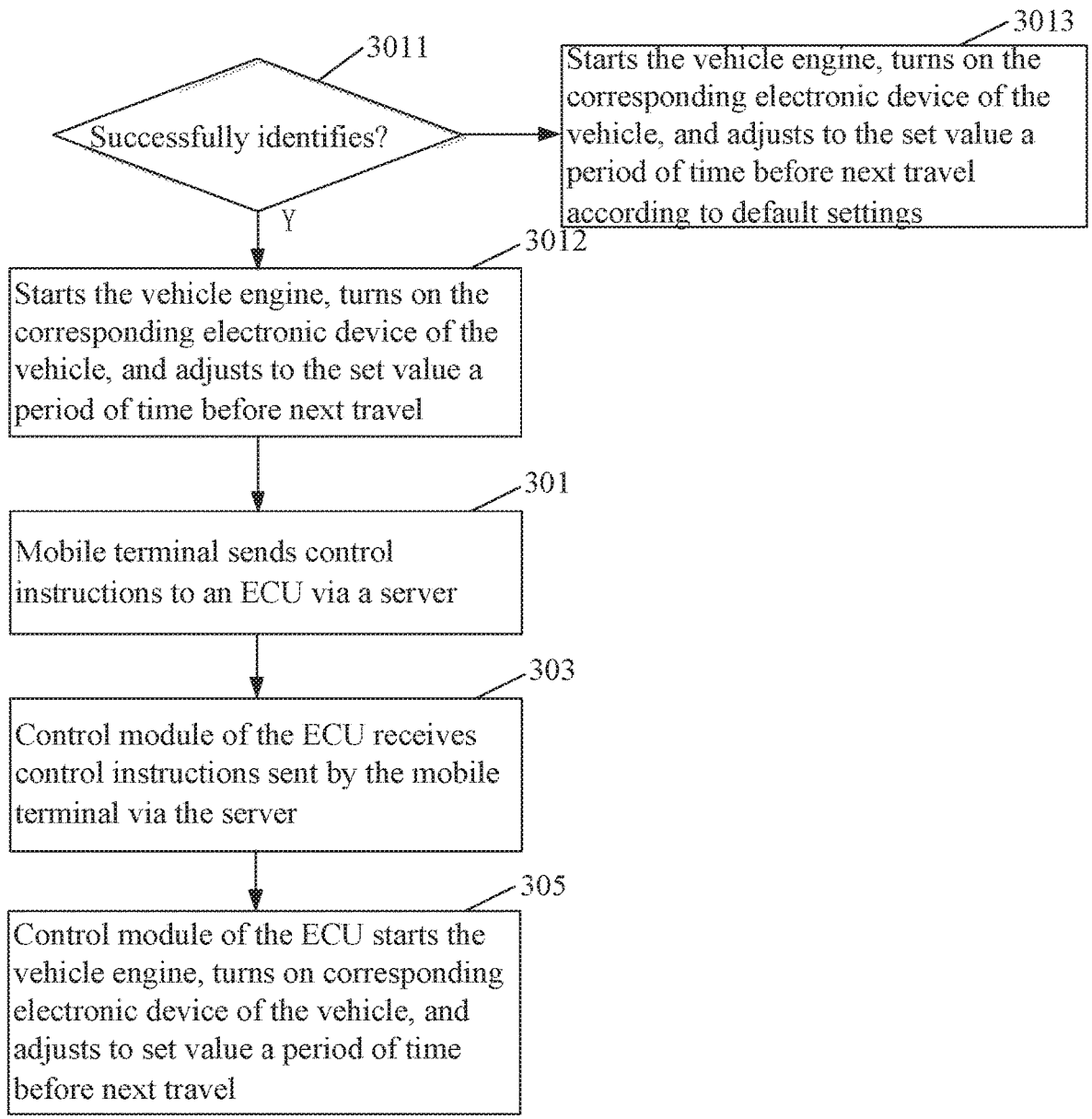
FIG. 3 is a flowchart of a remote vehicle control method in accordance with example embodiments of the present disclosure.

FIG. 3 is a flowchart of a remote vehicle control method in accordance with example embodiments of the present disclosure. Referring to FIG. 3, the remote vehicle control method includes the following steps:

Step 301: a mobile terminal sends control instructions to an ECU via a server.

Step 303: a control module of the ECU receives control instructions sent by the mobile terminal via the server.

Step 305: the control module of the ECU starts the vehicle engine, turns on corresponding electronic device of the vehicle, and adjusts to set value a period of time before next travel.

Referring to FIG. 3, before step 301, further includes the following steps:

Step 3011: a voice collection module of the ECU collects user's voice information after turning off vehicle engine, and identifies the user's voice information, if successfully identifies, turn to step 3012, if not successfully identifies, turn to step 3013.

Step 3012: the voice collection module of the ECU starts the vehicle engine, turns on the corresponding electronic device of the vehicle, and adjusts to the set value a period of time before next travel according to the user's voice information.

Step 3013: the voice collection module of the ECU starts the vehicle engine, turns on the corresponding electronic device of the vehicle, and adjusts to the set value a period of time before next travel according to default settings.

In other embodiments, steps 3011, 3012, 3013 can also be set behind step 305.

The remote vehicle control method provided by the present embodiment can send control instructions to the ECU by the mobile terminal via the server. The control module of the ECU receives control instructions sent by the mobile terminal via the server, starts the vehicle engine, turns on the corresponding electronic device of the vehicle, and adjust to the set value a period of time before next travel, thereby, ensuring the connection between the mobile terminal and the ECU via the server, realizing the remote control of the vehicle, making the mobile terminal become a steward, and increasing user experience and safety.

The Fourth Embodiment

Figure 4:
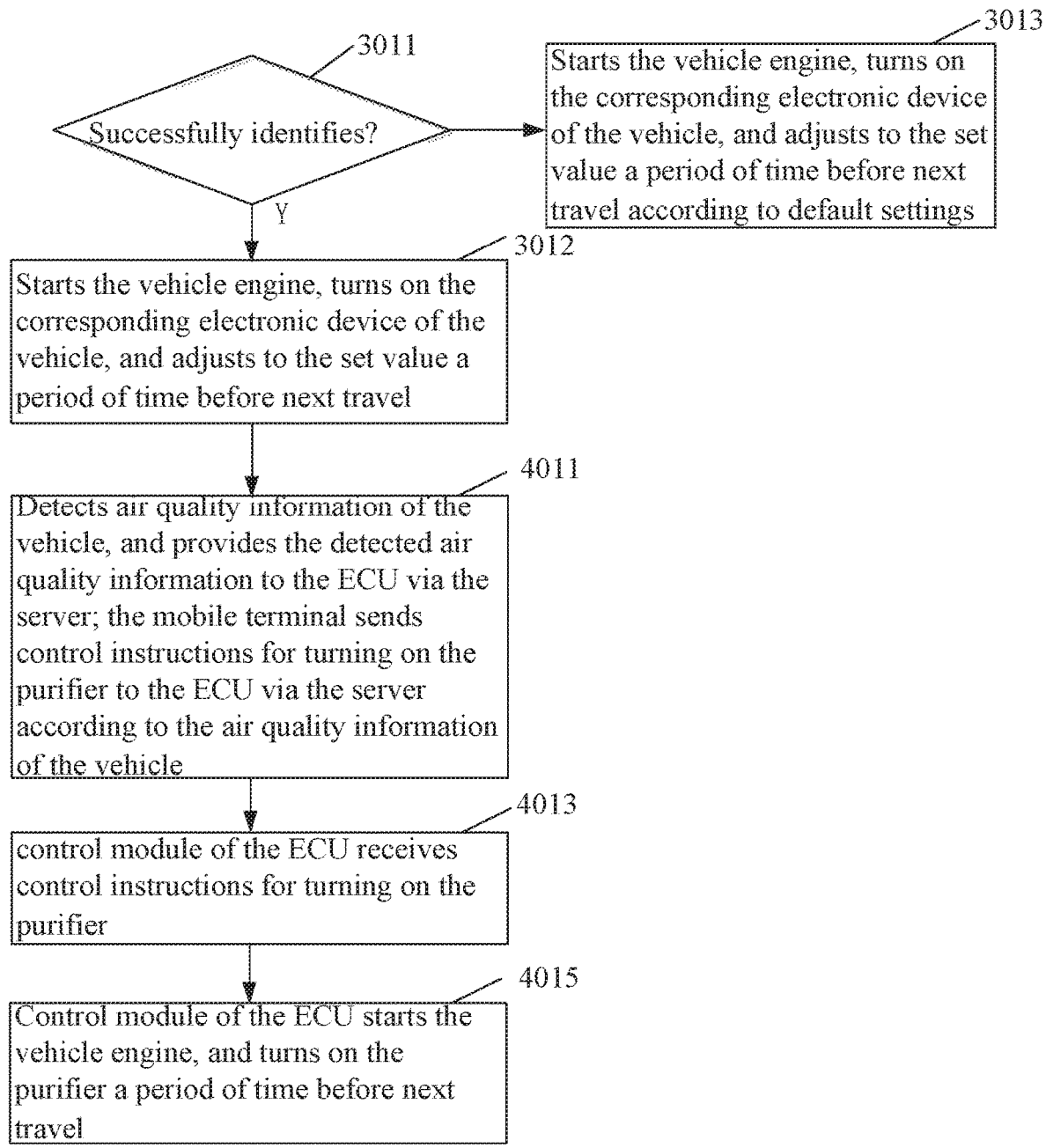
FIG. 4 is a flowchart of a remote vehicle control method in accordance with example embodiments of the present disclosure.

FIG. 4 is a flowchart of a remote vehicle control method in accordance with example embodiments of the present disclosure. Referring to FIG. 4, remote vehicle control method may further include the following steps 4011-4015:

In this embodiment, steps 301-305 can be divided into steps 4011-4015.

Step 4011: an air quality sensor detects air quality information of the vehicle, and provides the detected air quality information to the ECU via the server. The ECU provides the detected air quality information to the mobile terminal via the server. The mobile terminal sends control instructions for turning on the purifier to the ECU via the server according to the air quality information of the vehicle.

Step 4013: the control module of the ECU receives control instructions for turning on the purifier.

Step 4015: when receiving control instructions for turning on the purifier, the control module of the ECU starts the vehicle engine, and turns on the purifier a period of time before next travel.

In other embodiments, the remote vehicle control method can further include the following steps: the server obtains weather forecast, provides suggestions to the mobile terminal according to the weather forecast, the next travel and vehicle location. The mobile terminal sends control instructions to the ECU via the server according to the suggestions.

The remote vehicle control method provided by the present embodiment can detect air quality information of the vehicle via the air quality sensor and detect interior temperature of the vehicle via the temperature sensor. The mobile terminal can change settings of the ECU according to the vehicle environment information, for example, change next travel time or start the engine in advance. When the interior temperature of the vehicle is too high or too low, or air quality of the vehicle is too poor, the ECU can start the vehicle engine or turn on the purifier to adjust the vehicle environment earlier than expected, thereby improving user experience, not only facilitating remotely control the vehicle, but also ensuring the safety of the vehicle.

The Fifth Embodiment

Figure 5:
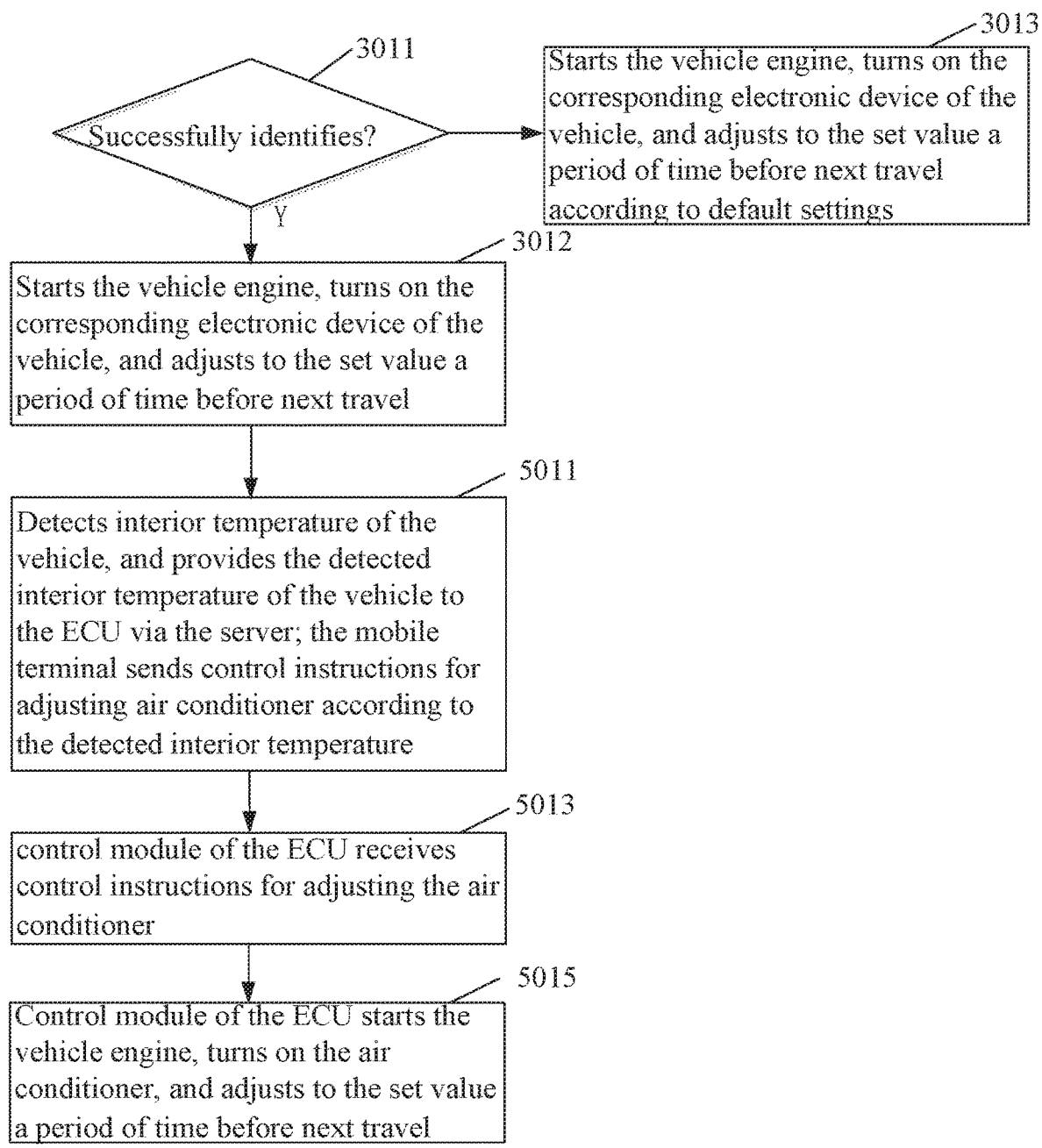
FIG. 5 is a flowchart of a remote vehicle control method in accordance with example embodiments of the present disclosure.

FIG. 5 is a flowchart of a remote vehicle control method in accordance with example embodiments of the present disclosure. Referring to FIG. 5, the remote vehicle control method may further include the following steps 5011-5015:

In this embodiment, steps 301-305 can be divided into steps 5011-5015.

Step 5011: a temperature sensor detects interior temperature of the vehicle, and provides the detected interior temperature of the vehicle to the ECU via the server. The ECU provides the detected interior temperature of the vehicle to the mobile terminal via the server. The mobile terminal sends control instructions for adjusting air conditioner according to the detected interior temperature.

Step 5013: the control module of the ECU receives control instructions for adjusting the air conditioner.

Step 5015: when receiving control instructions for adjusting the air conditioner, the control module of the ECU starts the vehicle engine, turns on the air conditioner, and adjusts to the set value a period of time before next travel.

In other embodiments, the remote vehicle control method can further include the following steps:

The mobile terminal determines the interior temperature of the vehicle is lower than a preset value, sends control instructions for blowing wind and removing frost to the ECU via the server. When receiving control instructions for blowing wind and removing frost, the control module of the ECU starts the vehicle engine, turns on the air conditioner of the vehicle to blow wind for the front windshield glass, and turns on rearview mirror to remove frost a period of time before next travel; or The mobile terminal determines the interior temperature of the vehicle is lower than a preset value, sends control instructions for heating and ventilating to the ECU via the server. When receiving control instructions for heating and ventilating, the control module of the ECU starts the vehicle engine, turns on the seat heating device to heat seat, and turns on seat ventilation device to ventilate seat.

The remote vehicle control method provided by the present embodiment can also determine the interior temperature of the vehicle is lower than a preset value, the mobile terminal can send control instructions for blowing wind and removing frost to the ECU via the server. When receiving control instructions for blowing wind and removing frost, the control module of the ECU can start the vehicle engine, turn on the air conditioner of the vehicle to blow wind for the front windshield glass, and turn on rearview mirror to remove frost, and can also turn on the seat heating device to heat seat, and turn on seat ventilation device to ventilate seat, thereby improving user experience, not only facilitating remotely control the vehicle, but also ensuring the safety of the vehicle.

The above descriptions are only preferred embodiments of the present invention, and are not intended to limit the present invention. Any amendments, replacement and modification made to the above embodiments under the principle of the present invention should be included in the scope of the present invention.

What is claimed is:

1. A remote vehicle control system, comprising: a mobile terminal, an ECU (Electronic Control Unit), and a server, the ECU comprising a control module;

the mobile terminal being connected to the server via a wireless network, and adapted to send control instructions to the ECU via the server;

the control module of the ECU being adapted to receive the control instructions sent by the mobile terminal via the server, and according to the control instructions, to start a vehicle engine, turn on a corresponding electronic device of the vehicle, and adjust a value of the corresponding electronic device to a set value a period of time before next travel and before a driver getting into the vehicle, the corresponding electronic device is selected from a group consisting of air conditioner, stereo, purifier, rearview mirrors, seat heating device, and seat ventilation.

2. The system as claimed in claim 1, wherein the ECU further comprises a voice collection module, the voice collection module of the ECU is adapted to collect user's voice information after turning off the vehicle engine, and identify the user's voice information, if successfully identifies, the control module controls to start the vehicle engine, turn on the corresponding electronic device of the vehicle, and adjust the value of the corresponding electronic device to the set value a period of time before next travel according to the user's voice information, if not successfully identifies, the control module controls to start the vehicle engine, turn on the corresponding electronic device of the vehicle, and adjust the value of the corresponding electronic device to a default value a period of time before next travel.

3. The system as claimed in claim 1, wherein the system further comprises an air quality sensor, the air quality sensor is adapted to detect air quality information of the vehicle, and provide the detected air quality information to the ECU via the server; the ECU provides the detected air quality information to the mobile terminal via the server; the mobile terminal sends the control instructions for turning on purifier to the ECU via the server according to the air quality information of the vehicle; after receiving the control instructions, the control module of the ECU is also adapted to turn on the purifier, start the vehicle engine, and turn on the purifier a period of time before next travel.

4. The system as claimed in claim 1, wherein the system further comprises a temperature sensor, the temperature sensor is further adapted to detect interior temperature of the vehicle, and provide the detected interior temperature to the ECU; the ECU provides the detected interior temperature to the mobile terminal via the server; the mobile terminal sends control instructions for adjusting air conditioner according to the detected interior temperature; after receiving the control instructions, the control module of the ECU is also adapted to start the vehicle engine, turn on the air conditioner, and adjust to adjust the value of the air conditioner to the set value a period of time before next travel.

5. The system as claimed in claim 4, wherein if an interior temperature of the vehicle is lower than a preset value, the mobile terminal is also adapted to send control instructions for blowing wind and removing frost to the ECU via the server; after receiving the control instructions for blowing wind and removing frost, the control module of the ECU is also adapted to start the vehicle engine, turn on the air conditioner of the vehicle to blow wind for a front windshield glass, and turn on a rearview mirror to remove frost a period of time before next travel; or
 if an interior temperature of the vehicle is lower than a preset value, the mobile terminal is also adapted to send control instructions for heating and ventilating to the ECU via the server; after receiving control instructions for heating and ventilating, the control module of the ECU is also adapted to start the vehicle engine, turn on a seat heating device to heat seat, or turn on a seat ventilation device to ventilate seat.

6. The system as claimed in claim 1, wherein the server is adapted to obtain weather forecast, provide suggestions to the mobile terminal according to the weather forecast, and a time arrangement and a target location of the next travel; the mobile terminal sends control instructions to the ECU via the server according to the suggestions.

7. A remote vehicle control method comprising:
 a mobile terminal sends control instructions to an ECU (Electronic Control Unit) via a server;
 a control module of the ECU receives control instructions sent by the mobile terminal via the server; according to the control instructions, the control module of the ECU starts vehicle engine, turn on a corresponding electronic device of the vehicle, and adjust a value of the corresponding electronic device to a set value a period of time before next travel and before a driver getting in the vehicle, the corresponding electronic device is selected from a group consisting of air conditioner, stereo, purifier, rearview mirrors, seat heating device, and seat ventilation.

8. The method as claimed in claim 7, further comprising:
 a voice collection module of the ECU collects user's voice information after turning off vehicle engine, and identifies the user's voice information;
 if successfully identifies, the voice collection module of the ECU starts the vehicle engine, turns on the corresponding electronic device of the vehicle, and adjusts the value of the corresponding electronic device to a set value a period of time before next travel according to the user's voice information;
 if not successfully identifies, the voice collection module of the ECU starts the vehicle engine, turns on the corresponding electronic device of the vehicle, and adjusts the value of the corresponding electronic device to a default value a period of time before next travel.

9. The method as claimed in claim 7, further comprising:
 an air quality sensor detects air quality information of the vehicle, and provides the detected air quality information to the ECU via the server; the ECU provides the detected air quality information to the mobile terminal via the server; the mobile terminal sends control instructions for turning on the purifier according to the air quality information of the vehicle; the control module of the ECU receives the control instructions for turning on purifier and starts the vehicle engine, and turns on the purifier a period of time before next travel.

10. The method as claimed in claim 7, further comprising:
a temperature sensor detects interior temperature of the vehicle, and provides the detected interior temperature of the vehicle to the ECU via the server; the ECU provides the detected interior temperature of the vehicle to the mobile terminal via the server; the mobile terminal sends control instructions for adjusting air conditioner according to the detected interior temperature; the control module of the ECU receives the control instructions and starts the vehicle engine, turns on the air conditioner, and adjusts to a value of the air conditioner to the set value a period of time before next travel.

11. The method as claimed in claim 10, further comprising:
 when the mobile terminal determines the interior temperature of the vehicle is lower than a preset value, the mobile terminal sends control instructions for blowing wind and removing frost to the ECU via the server; when receiving control instructions for blowing wind and removing frost, the control module of the ECU starts the vehicle engine, turns on the air conditioner of the vehicle to blow wind for a front windshield glass, and turns on a rearview mirror to remove frost a period of time before next travel; or
 when the mobile terminal determines the interior temperature of the vehicle is lower than a preset value, the mobile terminal sends control instructions for heating and ventilating to the ECU via the server; when receiving control instructions for heating and ventilating, the control module of the ECU starts the vehicle engine, turns on a seat heating device to heat seat, and turns on seat ventilation device to ventilate seat.

12. The method as claimed in claim 7, further comprising: the server obtains weather forecast, provides suggestions to the mobile terminal according to the weather forecast, and a time arrangement and a target location of the next travel; the mobile terminal sends control instructions to the ECU via the server according to the suggestions.

* * * * *